(12) United States Patent
Grant

(10) Patent No.: US 11,106,247 B2
(45) Date of Patent: Aug. 31, 2021

(54) CALCULATOR HAVING NUMBER KEYS FOR 3.663 AND 6.336

(71) Applicant: Strathspey Crown, LLC, Newport Beach, CA (US)

(72) Inventor: Robert Edward Grant, Laguna Beach, CA (US)

(73) Assignee: STRATHSPEY CROWN, LLC, Newport Beach, CA (US)

( * ) Notice: Subject to any disclaimer, the term of this patent is extended or adjusted under 35 U.S.C. 154(b) by 170 days.

(21) Appl. No.: 16/353,836

(22) Filed: Mar. 14, 2019

(65) Prior Publication Data

US 2020/0293092 A1 Sep. 17, 2020

(51) Int. Cl.
*G06F 15/02* (2006.01)
*G06F 1/16* (2006.01)

(52) U.S. Cl.
CPC .......... *G06F 1/1671* (2013.01); *G06F 15/025* (2013.01); *G06F 15/0225* (2013.01)

(58) Field of Classification Search
CPC ...... G06F 1/1671; G06F 15/02; G06F 15/025; G06F 15/0225
See application file for complete search history.

(56) References Cited

U.S. PATENT DOCUMENTS

| 3,604,620 | A | 9/1971 | Rakes |
| 8,365,098 | B2 | 1/2013 | Won et al. |
| 9,164,948 | B2 | 10/2015 | Chen et al. |
| 2003/0174073 | A1 | 9/2003 | Koppich |
| 2013/0219312 | A1 | 8/2013 | Abi-Saleh |
| 2014/0046989 | A1 | 2/2014 | Chandler |
| 2014/0330877 | A1* | 11/2014 | Chen ............... G06F 15/02 708/130 |

FOREIGN PATENT DOCUMENTS

EP 0 863 456 9/1998

OTHER PUBLICATIONS

International Search Report and Written Opinion; PCT/US20/22321; dated Jul. 7, 2020.
Robert Edward Grant, Unified Mathematics, Geometry and Music; Copy Reg. TX 8-675-258;2018, NPL Year: 2018.

* cited by examiner

*Primary Examiner* — Matthew D Sandifer
*Assistant Examiner* — Huy Duong
(74) *Attorney, Agent, or Firm* — Fish IP Law, LLP

(57) ABSTRACT

The present invention provides a calculator comprising number keys for digits one through nine, a NULL key, a first additional number key configured to represent 3.663, and a second additional fixed value number key configured to represent 6.336. The number keys are operatively coupled to processor configure to execute mathematical functions. The calculator can be a stand-alone device, or be executed within a cell phone, tablet, or other general purpose computer.

8 Claims, 3 Drawing Sheets

CALCULATOR HAVING NUMBER KEYS FOR 3.663 AND 6.336

FIELD OF THE INVENTION

The field of the invention is electronic input interfaces.

BACKGROUND

A standard numerical keypad has ten number keys (zero through nine), a decimal point, and function keys. There are ten number keys because most calculations are processed in base 10.

Numerical keypads are known, however, for other bases. For example, U.S. Pat. No. 3,604,620 to Rakes discloses a calculator having a slider that can be used to change between different numerical base systems, and that operates software that can perform basic calculations in different numerical base systems. Rakes does not disclose a calculator interface with twelve dedicated number keys, which can be used to input numbers specific to the base-12 number system, or for to represent the usual ten digits, plus two other constants.

U.S. Patent Application No. 2014/0046989 to Chandler discloses a calculator that displays results of a mathematical operation according two different numerical bases. However, Chandler still relies upon the standard ten numerical keys (zero through nine), and fails to disclose a calculator interface with twelve dedicated number keys.

The current inventor has appreciated that wave interference and many other physical phenomena can be best understood using base 12 mathematics. See for example the article, Unified Mathematics of Geometry and Music, which is registered in the copyright office as Reg. No. TX 8-674-258.

The current inventor has also appreciated that it may be useful for a numeric keypad to have dedicated keys to represent the numbers 3.663 and 6.336.

Thus, there is still a need in the art for input devices dedicated to a base-12 mathematical system, or to include dedicated keys to represent the numbers 3.663 and 6.336.

SUMMARY OF THE INVENTION

The present invention provides a numerical input device that includes various function keys plus twelve numerical input keys, the usual zero through nine keys, and additional keys representing either (a) $10_{base\ 10}$ and $11_{base\ 10}$, or (b) 3.663 and 6.336. In any of the embodiments discussed herein, mathematical functions can be performed in base 10 or base 12 numerical systems.

Various resources, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
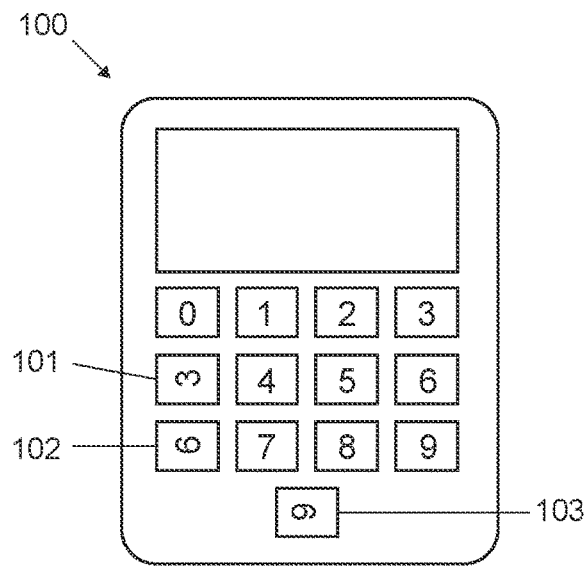
FIG. 1 is a schematic of an embodiment of a hand-held, computer, or other calculator having an interface with function keys, a decimal key, number keys for digits one through nine, a key for NULL, and two additional number keys, one that uses the symbol ෆ to represent PHEO (3.663), and the other that uses the symbol ৬ to represent SIEV (6.336).

FIG. 1 depicts an embodiment of a calculator having interface 100 with various function keys, a period key, and thirteen number keys. The number keys are used to input the usual one through nine digits, an additional number key 101 that uses the symbol ෆ to represent PHEO (3.663), another number key 102 that uses the symbol ৬ to represent SIEV (6.336), and another number key 103 that uses the symbol ෮ to represent NULL (9.999). Although not shown, the calculator has a physical or virtual toggle to switch between ෮ representing zero and representing 9.999.

All of the keys of FIG. 1, as well as FIGS. 2-7 and 9 herein, should be interpreted generically as being implemented in any combination of hard (physical) and soft (virtual) keys. Similarly, the calculators of FIGS. 1-7 and 9 should be interpreted generically as any of a stand-alone calculator, an iPad™ or other tablet, a laptop or desk top computer, and so forth. Thus, the entirety of what is displayed in FIGS. 1-7 and 9 should be viewed as the front view of a hand-held calculator, and alternatively viewed as a window on a display screen of a larger device.

Figure 2:
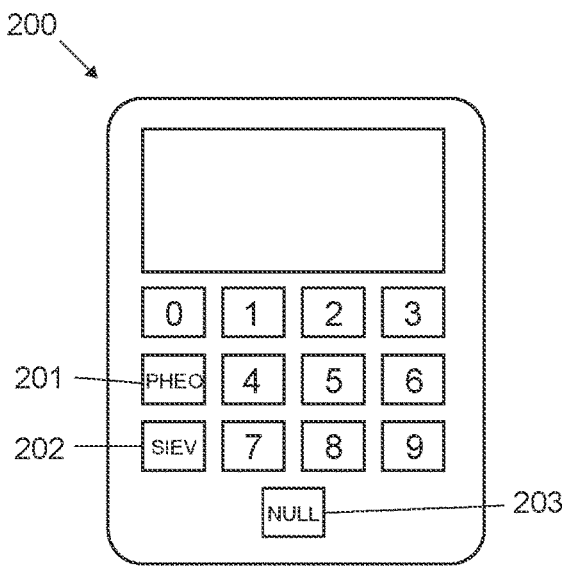
FIG. 2 is a schematic of an alternative embodiment of a calculator having an interface that uses the term PHEO (3.663) instead of ෆ and the term SIEV (6.336) instead of ৬.
Figure 3:
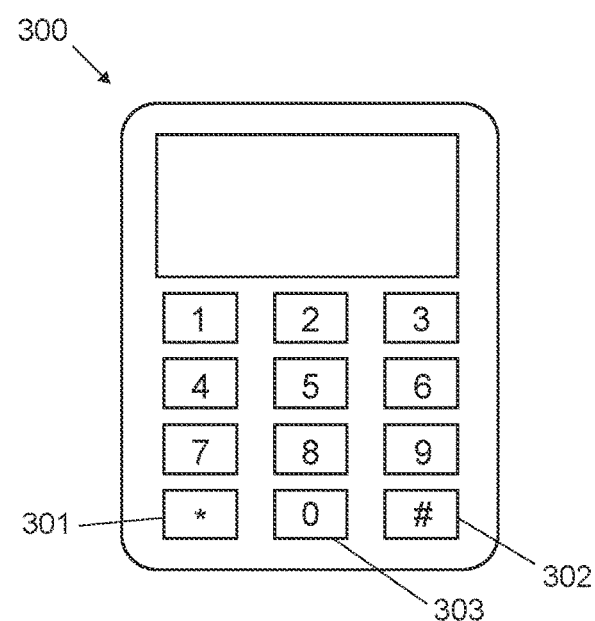
FIG. 3 is a schematic of another embodiment of a calculator having an interface that uses the "*" sign is used to represent PHEO (3.663), and the "#" to represent SIEV (6.336).

FIG. 2 is very similar to FIG. 1, except that in calculator 200 the number key 101 for the symbol ෆ has been replaced by number key 201 displaying the term PHEO (3.663), the number key 102 for the symbol ෮ has been replaced by number key 202 displaying the term SIEV (6.336), there is a designated zero key, and number key 103 for the symbol ↻ (9.999) has been replaced by number key 203 displaying the term NULL FIG. 3 is also similar to FIG. 1, except that in calculator 300 the number key 101 for the symbol ↶ has been replaced by key 301, where the "*" sign is used to represent PHEO (3.663), and number key 102 has been replaced by key 302 displaying the "#" to represent SIEV (6.336), and number key 103 for the symbol ↻ (9.999) has been replaced by a designated zero key 303.

Figure 4:
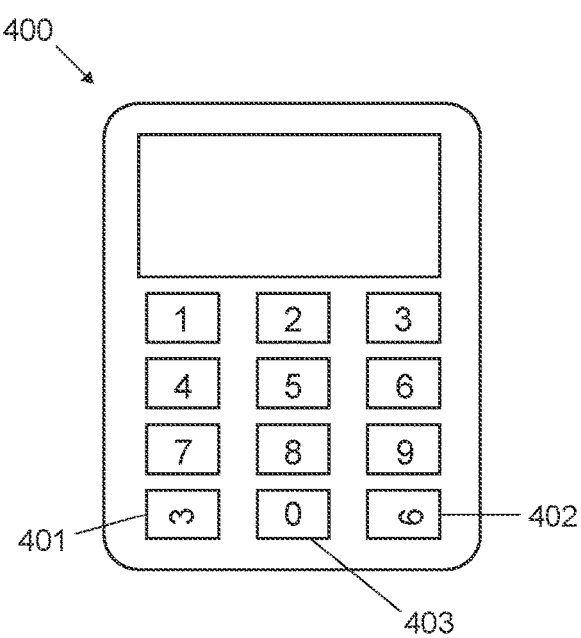
FIG. 4 is a schematic of another embodiment of a calculator having an interface that uses the symbol ෆ to represent PHEO (3.663), and the symbol ৬ to represent SIEV (6.336).

FIG. 4 is also similar to FIG. 1, except that that in calculator 400 the number key 101 for the symbol ↶ has been relocated to key 401 in the lower left corner of the interface 400, the number key 102 for the symbol ↺ has been relocated to key 402 in the lower right corner of the interface 400, and a zero key 403 is used to represent zero or 9.999.

Figure 5:
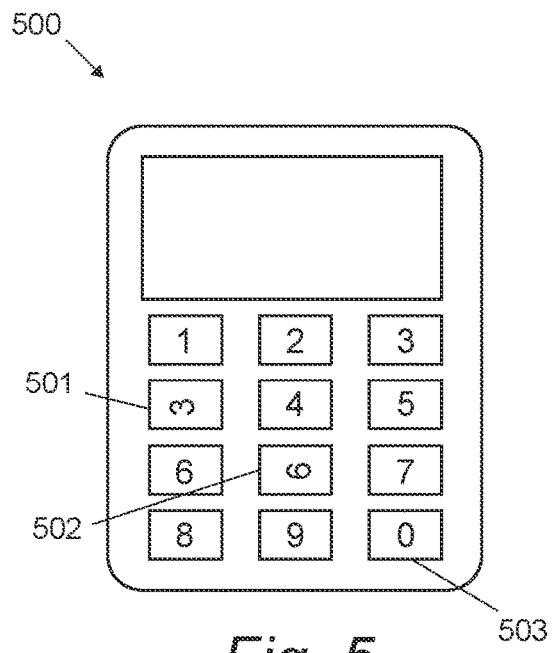
FIG. 5 is a schematic of another embodiment of a calculator having an interface that uses the symbol ෆ to represent PHEO (3.664), and the symbol ৬ to represent SIEV (6.336).

FIG. 5 is also similar to FIG. 1, except that number key 501 is used to represent the symbol ↻ number key 502 is used to represent the symbol ↺, and the zero key 503 is relocated to the bottom right corner of the interface 500, and is used to represent zero or 9.999.

Figure 6:
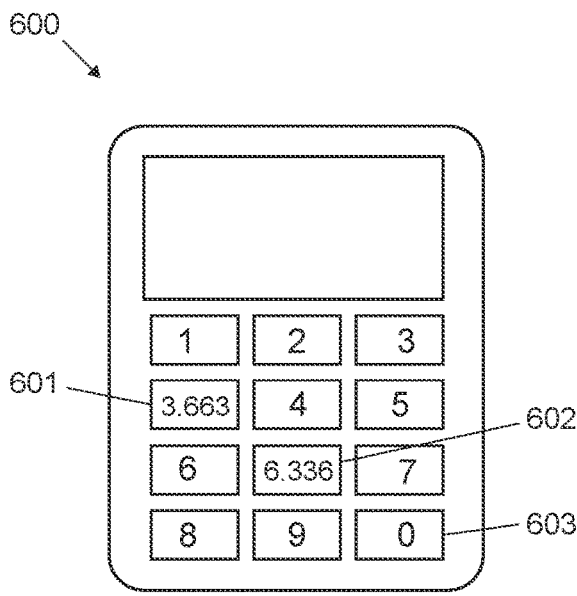
FIG. 6 is a schematic of another embodiment of a calculator having an interface that uses the symbol ෆ to represent PHEO (3.664), and the symbol ৬ to represent SIEV (6.336).

FIG. 6 depicts another embodiment of FIG. 1, except that in calculator 600 the number key 101 for the symbol ↻ has been replaced by key 601 having the value 3.663, and the number key 102 for the symbol ↺ has been replaced by key having the value 6.336, and the symbol ↻ has been replaced by a zero key 603 to represent zero or 9.999.

Figure 7:
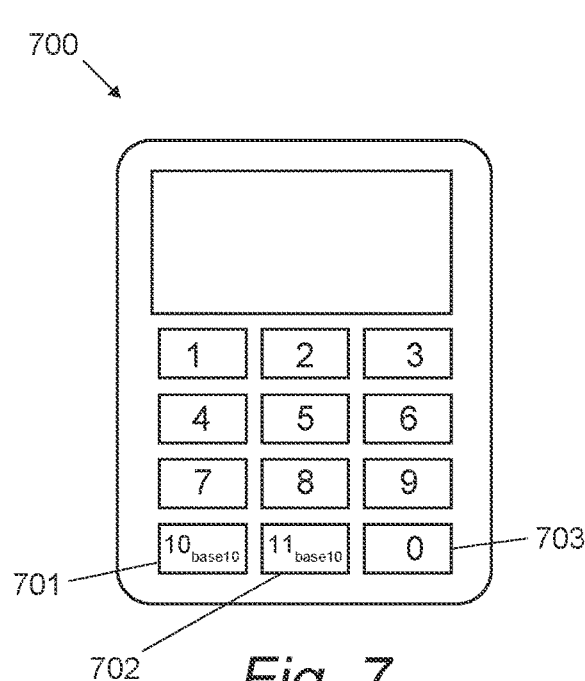
FIG. 7 is a schematic of an alternative embodiment of a calculator having a base-12 interface, with two additional keys that represent "$10_{base\ 10}$" and "$11_{base\ 10}$", respectively.

FIG. 7 is similar to FIG. 1, except that in calculator 700 the number key 101 for the symbol ↶ has been replaced by key 710, depicting the term "$10_{base10}$" to represent PHEO (3.663), and the number key 102 for the symbol ↺ has been replaced by key 702, depicting the term "$11_{base10}$" to represent SIEV (6.336), and number key 103 for the symbol ↻ (9.999) has been replaced by a designated zero key 703 to represent zero or 9.999.

Figure 8:
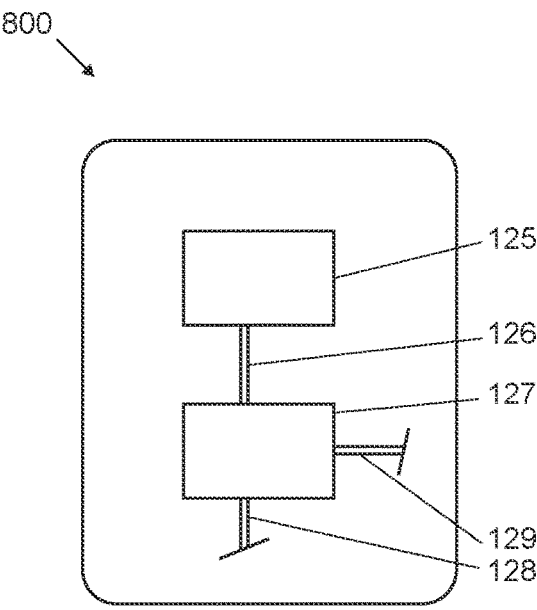
FIG. 8 is a schematic of relevant internals of any of the calculators of FIGS. 1-7.

FIG. 8 depicts relevant internals of the calculator of FIG. 1, depicted here as calculator 800. Corresponding internals are contemplated for each of the interfaces of FIGS. 2-7.

As depicted, interface 100 generally comprises a battery 125 or other power supply, a processor 127, power connectors 126, data connectors 128 to the input keys, and data connector 129 to the display area.

Figure 9:
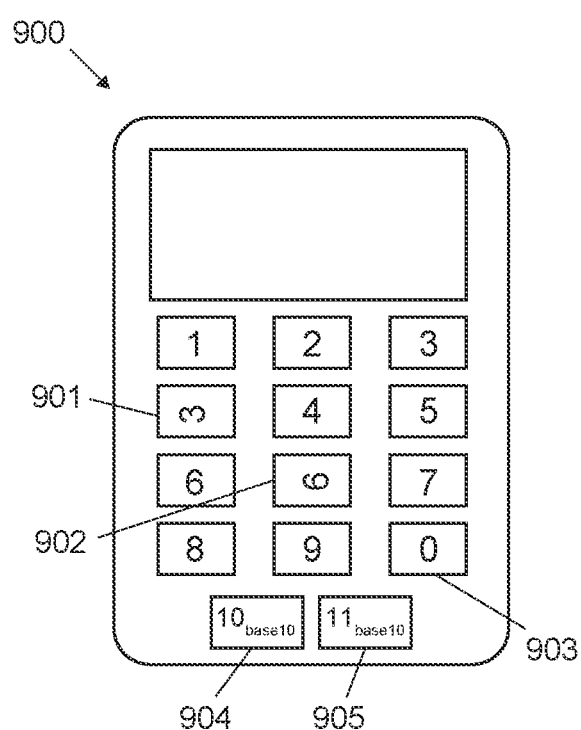
FIG. 9 is a schematic of an alternative embodiment of a calculator having a base-12 interface, with a number key configure to represent 3.663, another number key configured to represent 6.336, another number key configured to represent $10_{base\ 10}$, and another number key configured to represent $11_{base\ 10}$.

FIG. 9 is a schematic of an alternative embodiment, in which calculator 900 has a base-12 interface, with a number key 901 configure to represent 3.663, another number key 902 configured to represent 6.336, another number key 903 configured to represent $10_{base10}$, and another number key configured to represent $11_{base10}$.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something designated from the group consisting of A, B, C . . . and N, the text should be interpreted as requiring only one element from the group, not A plus N, or B plus N, etc.

What is claimed is:

1. A calculator having an interface comprising:
    a display are that displays an array containing: function keys; number keys for digits one through nine; a NULL key; at least a first additional number key configured to represent 3.663, and a second additional fixed value number key configured to represent 6.336; and
    a processor configured to receive input from the number keys, uses the input to perform a mathematical function, and sends results of the mathematical function to the display area.

2. The calculator of claim 1, wherein a first one of the additional fixed number keys is configured to use the symbol ↶ to represent 3.663, and a second one of the additional fixed number keys is configured to use the symbol ↺ to represent 6.336.

3. The calculator of claim 1, wherein a first one of the additional fixed number keys is configured to use the term PHEO to represent 3.663, and a second one of the additional fixed number keys is configured to use the term SIEV to represent 6.336.

4. The calculator of claim 1, wherein the NULL key is configured to represent zero.

5. The calculator of claim 1, wherein the NULL key is configured to represent 9.999.

6. The calculator of claim 1, wherein one of the additional keys is positioned between the three and four keys.

7. The calculator of claim 1, wherein one of the additional keys is positioned between the six and seven keys.

8. The calculator of claim 1, further comprising a third additional fixed number key configured to represent $10_{base10}$, and a fourth additional fixed number key configured to represent $11_{base10}$.

* * * * *

UNITED STATES PATENT AND TRADEMARK OFFICE
CERTIFICATE OF CORRECTION

| | | |
|---|---|---|
| PATENT NO. | : 11,106,247 B2 | Page 1 of 1 |
| APPLICATION NO. | : 16/353836 | |
| DATED | : September 7, 2021 | |
| INVENTOR(S) | : Robert Edward Grant | |

It is certified that error appears in the above-identified patent and that said Letters Patent is hereby corrected as shown below:

In the Claims

Claim 1
Column 4, Line 19, "a display are that" should read --a display area that--

Signed and Sealed this
Sixteenth Day of August, 2022

*Katherine Kelly Vidal*

Katherine Kelly Vidal
*Director of the United States Patent and Trademark Office*